Figure 1:
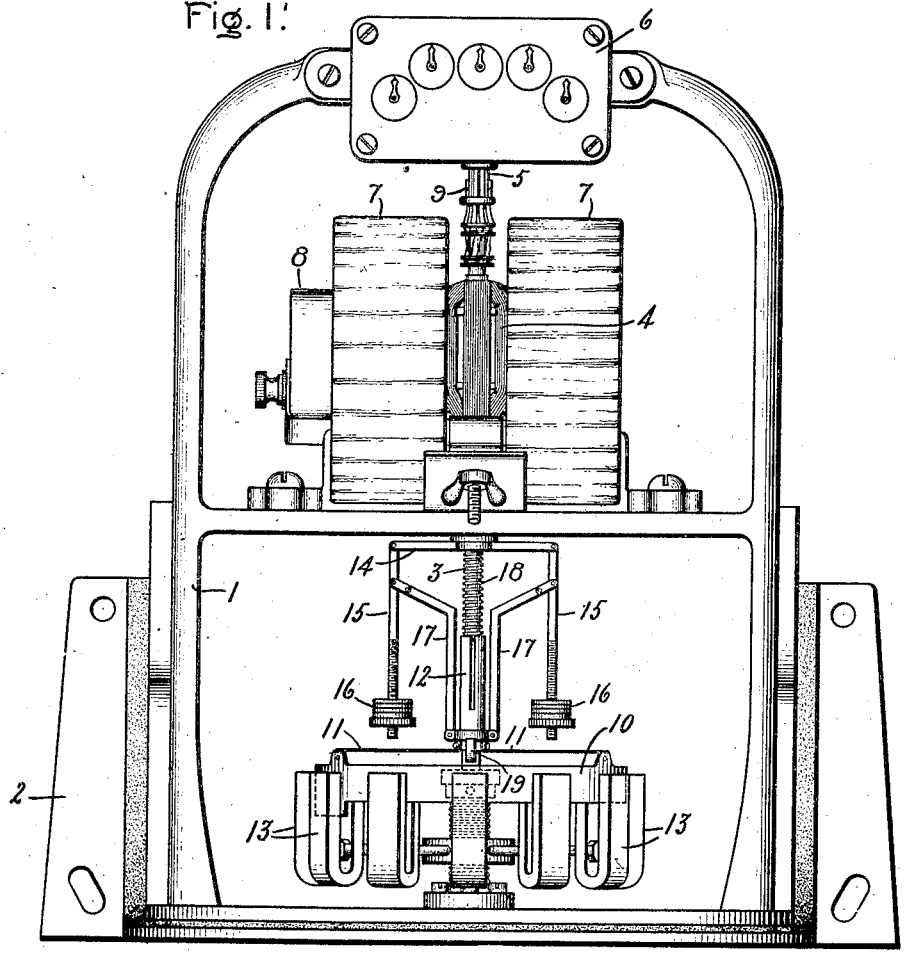

No. 831,478. PATENTED SEPT. 18, 1906.
E. SCHATTNER.
METERING SYSTEM.
APPLICATION FILED AUG. 19, 1905.

Witnesses:
George W. Tilden.
Helen Orford

Inventor:
Ernest Schattner,
by Albert G. Davis
Att'y.

UNITED STATES PATENT OFFICE.

ERNEST SCHATTNER, OF SCHENECTADY, NEW YORK, ASSIGNOR TO GENERAL ELECTRIC COMPANY, A CORPORATION OF NEW YORK.

METERING SYSTEM.

No. 831,478.  Specification of Letters Patent.  Patented Sept. 18, 1906.

Application filed August 19, 1905. Serial No. 274,895.

*To all whom it may concern:*

Be it known that I, ERNEST SCHATTNER, a subject of the King of Great Britain, residing at Schenectady, county of Schenectady, State of New York, have invented certain new and useful Improvements in Metering Systems, of which the following is a specification.

This invention relates to a method of and apparatus for metering electric energy supplied to consumers.

The object of the invention is to provide a method of metering electric energy by which the charges are closely proportional to the cost of supplying the energy and an apparatus for metering in accordance with this method consisting of a single device the operation of which is readily understood.

It has been common heretofore to supply electric energy to consumers at a definite rate per unit of energy, if the consumer does not use more than a definite maximum amount of energy at any one time and to increase this rate upon a predetermined schedule if the consumer exceeds this predetermined maximum. This is known as the "maximum-demand" system. In accordance with this system two instruments are usually installed on a consumer's premises, one an integrating-meter, to measure the total energy supplied, and the other a demand instrument, indicating the maximum current used at any one time. This system possesses certain disadvantages, among which may be mentioned the cost of the two instruments, the expense of installing them, and the fact that the graduation of the charges is not readily understood by the consumers. My invention contemplates avoiding these objectionable features by employing a single instrument consisting of a meter of the type now in common use to measure the energy supplied to a consumer, increasing the rate of actuation of the motive device of the meter per unit of energy as the energy supplied increases, and maintaining the actuation of the motive device at the rate to which it is increased. This can be readily done in a meter of ordinary construction, consisting of a motor driving a register, by providing means for increasing the speed of the rotatable element of the motor per unit of energy as the energy supplied increases and maintaining this increased rate of rotation. The increase in the rate at which the motive device of the meter is actuated as the demand increases may be effected in various ways. It may be effected directly by the current flowing in the system or indirectly by the movable element of the meter, which of course is driven at a speed proportional to the current flowing in the system. The increases in the current flowing or in the speed of the movable element of the meter may be arranged to vary a resistance in a circuit of the meter or to move the damping-magnets to a less effective position to vary the speed of the motive device per unit of energy. I prefer, however, to arrange the closed conductor of the mechanism for damping the movements of the movable element of the meter, so that it can be moved into and out of the field of the permanent magnet or magnets coöperating therewith and to effect this movement by means of a centrifugal device of the ball-governor type carried by the shaft of the meter. I will describe a meter constructed in this manner with reference to the accompanying drawings, which show the apparatus I prefer to use, and in which—

Figure 2:
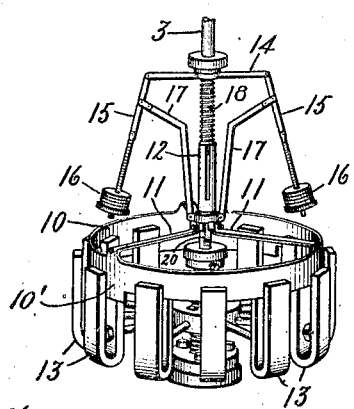
Figure 3:
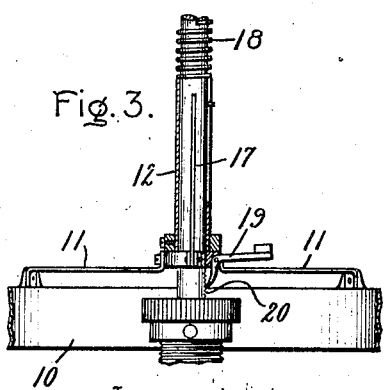

Figure 1 is a front view of the meter with the cover removed. Fig. 2 is a perspective view of the damping device, and Fig. 3 is a detail view of the pawl-and-ratchet device.

Referring to the drawings, the meter consists of a frame 1, secured to a suitable support 2 and carrying bearings for the shaft 3, on which are mounted the armature 4 and commutator 5 of the meter-motor. A registering device 6 is driven by shaft 3 by means of a worm-wheel in driving relation to the dial-train and meshing with a worm on the shaft. Field-coils 7 7 are mounted in inductive relation to the armature 4 and arranged to be connected in series in one of the lines entering the consumer's premises. An auxiliary field-coil 8 is also mounted in inductive relation to armature 4 to compensate for friction in the meter. Coil 8 is connected in series with armature 4 by means of brushes 9, bearing on the commutator 5 and a suitable resistance across the lines, so that the current therein varies with the voltage of the system. In meters of this type it is necessary to retard the rotations of the movable element, and this retardation is usually effected by a closed conductor, such as a disk or cylinder of conducting material carried by the shaft of the movable element and arranged to cut the line of force of one or more permanent magnets. For this purpose I provide a ring 10 of conducting material, secured by means of arms 11 to a sleeve 12, which is mounted to slide freely on the shaft 3. A plurality of permanent magnets 13 are supported in a vertical position, so that the ring 10 cuts their fields. In order to vary the retarding effect of the ring 10 and magnets 13, I provide a centrifugal device of the ball-governor type on shaft 3, which is arranged to lift the ring 10 to decrease the portion of the ring which rotates in the fields of the magnets. Secured to shaft 3 is a support 14, to the ends of which are pivoted rods 15 15, carrying at their ends weights 16 16. These weights are threaded on the rods, so that their positions may be adjusted to vary their effect. Rods 17 17 are pivoted at one end to the rods 15 15 and at the other end to the sleeve 12. It will be seen that as shaft 3 rotates the weights 16 16 will move out radially from the shaft by centrifugal force and lift the sleeve 12 and the ring 10, carried thereby. Between the support 14 and the upper end of sleeve 12 a spring 18 is coiled on shaft 3. This spring offers a constantly-increasing resistance to the upward movement of the sleeve. Without it the decrease in the retarding effect when the speed of the meter increases and the ring 10 is lifted would cause the movable element of the meter to speed up and lift the ring still farther. In order that the ring 10 will not be lifted entirely out of the fields of the magnets, in which case there would be no damping effect whatever, I make one portion, 10', of the ring 10 wider than the remainder and arrange the parts so that at the highest position of the ring this wider portion will be within the fields of the magnets. Pivoted on the sleeve 12 is a tooth or pawl 19, which engages with closely-spaced ratchet-teeth 20, formed on the shaft 3. This pawl-and-ratchet device holds sleeve 12 and ring 10 at the highest positions to which they are moved by the weights 16 16.

When the meter is connected in a consumer's circuit and energy is used by the consumer, the movable element of the meter is rotated and weights 16 16 move out radially from shaft 3 a distance proportional to the speed of the meter and hence to the amount of energy supplied. This movement of the weights operates to raise the ring 10, so that less of it is in the fields of the magnets 13, and the pawl 19 engages a tooth of the ratchet 20 to hold the ring 10 in the highest position to which it is moved. The retarding effect of ring 10 and magnets 13 is thus decreased, and a unit of energy passing through the meter will effect a greater registration on the dial 6 than the same amount of energy supplied to the consumer when the ring 10 was in a lower position. The amount which the consumer has to pay per unit of energy supplied him therefore increases with increases in the maximum energy consumed, and when the rate per unit of energy is increased this rate continues until the meter is read and the parts restored to their original positions by disengaging the pawl from the ratchet and allowing the ring 10, sleeve 12, and weights 16 to drop to the positions shown in Fig. 1. Maintaining the rotation of the movable element of the meter per unit of energy at the point to which it is increased is of great importance, as in this way the charges for the energy supplied to the consumer are more nearly proportional to the cost of supplying the energy. If the rate were allowed to fall as soon as the demand falls, a consumer could use a very large maximum amount of energy for a short period and pay only a small amount for it; but this large maximum amount of energy would require in the central station additional generating apparatus, which would be in use and hence earning a return only a short period. The centrifugal device may be so arranged that the weights begin to move out when only a very small amount of energy is being supplied to the consumer and move out more and more as this amount increases, or they can be arranged so that no movement is made until the energy supplied to the consumer exceeds a certain predetermined amount and then move more and more as the energy supplied increases. In the first case the rate paid by the consumer per unit of energy would increase steadily as the demand increases, and in the latter case the consumer would have to pay a definite rate for energy supplied him if he did not exceed a certain predetermined maximum and an increased rate if he did exceed that maximum proportioned to the amount of the excess. It will be seen that with this meter the charges for energy supplied may be closely proportional to the cost of supplying the energy, that the energy is metered by a single device, and that the operation of this device would be easily understood by consumers of electric energy who are not skilled in the art.

The features of my invention can be employed in metering devices differing widely from that shown and described herein without departing from the spirit of my invention. Also the features of my invention are applicable to meters of the induction type as well as to the communicating type of meter, which I have illustrated. All such modifications I consider within the scope of my invention and aim to cover them by the terms of the claims appended hereto.

What I claim as new, and desire to secure by Letters Patent of the United States, is—

1. The method of metering the supply of electric energy consisting in causing the energy to actuate a registering device, increasing the actuation of the registering device per unit of energy as the energy supplied increases, and maintaining the actuation of the registering device at the rate to which it is increased.

2. The method of metering the supply of electric energy consisting in causing the energy to actuate a registering device, increasing the actuation of the registering device per unit of energy in proportion to increases in the energy supplied above a predetermined amount, and maintaining the actuation of the registering device at the rate to which it is increased.

3. The method of metering the supply of electric energy consisting in causing the energy to actuate a motor device, registering the movements of said motor device, increasing the rate of actuation of the motor device per unit of energy as the energy supplied increases, and maintaining the actuation of the motor device at the rate to which it is increased.

4. In a system of distribution of electric energy, an electric meter comprising a motor actuated by the energy of the system, a register driven thereby, means for increasing the actuation of the motor per unit of energy as the energy flowing in the system increases, and means for maintaining the actuation of the motor at the rate to which it is increased.

5. In a system of distribution of electric energy, an electric meter comprising a motor actuated by the energy of the system, a register driven thereby, means for increasing the actuation of the motor per unit of energy with increases in the energy flowing in the system above a predetermined amount, and means for maintaining the actuation of the motor at the rate to which it is increased.

6. In a system of distribution of electric energy, an electric meter comprising a motor, a register actuated thereby, means for retarding the rotation of the movable element of the motor, means for decreasing the retarding effect of said means per rotation of the movable element with increases in the energy flowing in the system, and means for maintaining said retarding effect at the point to which it is decreased.

7. In a system of distribution of electric energy, an electric meter comprising a motor having a rotatable element, a register driven by the motor, means carried by the shaft of said rotatable element and actuated by centrifugal force for increasing the rotation of the rotatable element per unit of energy as the energy flowing in the system increases, and means for maintaining the rotation of said element at the rate to which it is increased.

8. An electric meter comprising a motor having a rotatable element, a register driven by the motor, means for retarding the rotation of the rotatable element of the motor, means carried by the shaft of said rotatable element and actuated by centrifugal force for decreasing the retarding effect of said means per rotation of the rotatable element, and means for maintaining the retarding effect at the point to which it is decreased.

9. An electric meter comprising a motor having a rotatable element, a register driven by the motor, a closed conductor carried by the shaft of the rotatable element, a permanent magnet coöperating with said conductor, means carried by the shaft of the rotatable element and actuated by centrifugal force for moving the conductor and magnet relatively to decrease the retarding effect thereof, and means for maintaining the conductor and magnet in the relation to which they are moved.

10. An electric meter comprising a motor having a rotatable element, a register driven by the motor, a closed conductor carried by the shaft of the rotatable element, a permanent magnet coöperating therewith, means carried by the shaft of the rotatable element and actuated by centrifugal force for moving the conductor relatively to the magnet to decrease the retarding effect thereof, a spring opposing the effect of said means, and a latch to hold the conductor in any position to which it is moved.

In witness whereof I have hereunto set my hand this 9th day of August, 1905.

ERNEST SCHATTNER.

Witnesses:
BENJAMIN B. HULL,
HELEN ORFORD.